Patented Sept. 25, 1934

1,974,605

UNITED STATES PATENT OFFICE 1,974,605

RESINOUS COMPOSITION FROM PHENOL AND ACETALDEHYDE AND PROCESS OF MAKING SAME

Carleton Ellis, Montclair, N. J., assignor to Ellis-Foster Company, a corporation of New Jersey No Drawing. Application March 7, 1924, Serial No. 697,473

2 Claims. (Cl. 260—4)

This invention relates to a resinous material or composition obtained from phenol, acetaldehyde or paraldehyde and the like and to process of making same.

Resinous compositions obtained from phenol and acetaldehyde or paraldehyde have long been known. For example Smith, United States Patent 643,012, February 6, 1900 treated 2 parts by volume of paraldehyde with 3 parts by volume of phenol in the presence of hydrochloric acid and methylated spirit or fusel oil. A product which sets or hardens is obtained. This as noted in corresponding German patent to Smith, No. 112,685 of July 6, 1900, is insoluble even by boiling in such solvents as glacial acetic acid, chloroform, ether and alcohol. The greater resistance to heat is also noted in aforesaid German patent.

The present invention involves Smith's resin in that phenol is treated with paraldehyde in the presence of an acid catalyst but the present invention involves details of preparation of a molding composition of improved properties and qualities which constitute an advance in the plastic molding field.

It is my observation that most descriptions relating to phenol-aldehyde resins fail to disclose data properly serving the skilled public with working information on the highly technical subject of synthetic resin plastics and that a vast amount of experimenting usually is required and many failures result from such incomplete disclosures. In the present specification an object is to set forth the subject matter free from any reservations of this kind.

My invention involves the production of a resin of the Smith's resin type and incorporating this with a hardening agent having an active methylene group. In more specific aspects it involves the use of certain substances which prevent adhesion to the molds and other additions capable of improving the working qualities, speed of hardening and the like, all as will be more fully hereinafter described. The present application embraces a procedure which serves as a disclosure of a method of making a quick-curing resin or molding composition adapted to the high speed requirements of present-day molding such as in the production of electrical insulation, laminated pressboard and the like and also quick-curing varnishes.

The hardening agent employed may be acetaldehyde or paraldehyde or paraform, hexamethylenetetramine, which for convenience may be termed hexa, and various other compounds derived from reaction of ammonia with aldehydes such as acetaldehyde, furfural and the like.

It has of course long been known that substances such as hexamethylenetetramine serve as hardening agents by providing an active methylene group. This substance has been proposed by Lebach and Wetter (Ellis "Synthetic Resins and Their Plastics", page 109), and attention is called to Aylsworth, United States Patent No. 1,020,593, March 19, 1912 setting forth the use of hexa as an addition to resins obtained from phenol and formaldehyde. The employment of hexa as a hardening or finishing agent has been in commercial practice for many years being in fact one of the tools of the trade as it were for ten years or more.

My invention involves more than the simple expedient of adding hexa to Smith's resin. The procedure disclosed herein embraces details of operation necessary to yield powdered molding compositions which can be hot pressed to make infusible or heat resistant molded articles of good strength and high surface finish, resistance to water, solvents and the like and in general meeting the requirements of the molding trade.

A brief description of production of a molding composition from phenol, acetaldehyde, hexa and a filler has been given in my book on Synthetic Resins (New York, 1923, p. 159).

Practically all resinous substances harden when exposed to a baking heat. Thus baking japans and the industry of cold molding is based to a considerable extent upon this property. The so-called fusible resins made from phenol and formaldehyde or from phenol and acetaldehyde and the like will generally speaking harden and even become infusible on long protracted baking. In the present invention I refer to the quality of hardening under the application of heat to identify a more rapid change which takes place which allows in many cases of the production of molded articles in a hot press in 4 or 5 minutes time. Longer exposure to heat, say from 15 minutes to 2 hours will bring about hardening to an infusible product in most instances. Insofar as the present compositions are concerned this more rapid change as distinct from the slow hardening taking place by baking when natural and synthetic resins, asphalts and the like are exposed to heat constitutes a feature of the present invention.

When phenol is treated with a reactive aldehyde in molecular proportions, that is 1 mol of phenol to 1 mol of the aldehyde, or if the aldehyde is in excess an infusible resin frequently is obtained which hardens rapidly on heating.

It has been customary to make fusible resins by using a lesser amount of an aldehyde for example formaldehyde and adding to the fusible resin a compound having an active methylene group such as hexa to supply additional methylene groups to bring about rapid conversion to an infusible product. This has been the practice in many years so far as I am advised in the making of such products as "Bakelite", "Condensite" and "Redmanol".

Following along the lines enunciated by Smith I may use an excess of acetaldehyde, this obviating the employment of other substances such as hexa. The use of the latter, as hereinafter noted, is however not precluded.

Smith employed 2 volumes of paraldehyde to 3 volumes of phenol containing 5 per cent of water. If allowance is made for the water this would correspond to about 2 parts by weight of paraldehyde to 3 parts by weight of phenol.

The ratio of acetaldehyde to phenol therefore is 1:1.5.

The molecular weight ratio of acetaldehyde to phenol is 44:94 corresponding approximately to 1:2.1.

Smith therefore used an excess of acetaldehyde for to 3 parts of phenol he used 2 parts of paraldehyde whereas 1.4 parts are required for full molecular combination and complete resinification. The surplus 0.6 parts constituted an excess of approximately 40 per cent so that the paraldehyde itself served as a hardening agent. In like manner an effect similar or even more active in some cases may be obtained by employing paraform, hexamethylenetetramine, methylal compounds and methylene esters.

Resinification reactions between phenol and acetaldehyde are carried out with some difficulty owing to the highly volatile nature of acetaldehyde. On the other hand paraldehyde is a liquid which can be readily shipped and handled. Acetaldehyde reacts with phenol with the evolution of considerable heat. Paraldehyde when broken down into acetaldehyde by the addition of a small quantity of strong mineral acid absorbs heat. These features preferably are utilized in the present invention as a means or regulating the control of temperature during resinification. If the entire amount of paraldehyde is added at one time to the requisite quantity of phenol in the presence of an acid catalyst the reaction especially on the large scale may become too violent yielding an unsatisfactory product.

In the present invention the paraldehyde is preferably added gradually to a quantity of phenol in the presence of an acid catalyst and the absorption of heat by conversion of paraldehyde into acetaldehyde may be used to counteract the evolution of heat due to reaction between acetaldehyde and phenol. By proportioning the rate of addition of the paraldehyde a satisfactory control of the temperature of the batch may be obtained.

Thus for example approximately 100 parts of phenol are heated to about 50° C. and are acidulated with 1 part of concentrated hydrochloric acid and 50 parts of paraldehyde are added very slowly through a reflux condenser. Reaction takes place and the paraldehyde is added at such a rate as to maintain the reaction mixture at about 50° C. Cooling may be required depending on external temperature. It is allowed to stand for a time, for example overnight, and the following day is heated gradually to a temperature of 150° C. under reflux condenser. This will require from one to several hours depending on the size of the batch.

Finally any free mineral acid may be neutralized by the addition of a small quantity of sodium carbonate or other neutralizing agent. The resin so obtained may be dissolved in a solvent such as acetone and mixed with asbestos fibre or other filling material. It may be molded in the cold and subsequently baked according to the cold molding procedure or it may be molded in hot press, cooled somewhat and removed from the mold. The molded articles obtained in this manner are not infusible.

Or a mixture may be made of the resin with equal parts of wood flour. The resin is dissolved in a solvent, 5 to 10 per cent of hexamethylenetetramine added, and the wood flour impregnated with this mixture. The composition is dried in a vacuum drier at 28 inches vacuum gage and at a temperature gradually increasing to about 85° C. and then may be ground in a ball mill with 2 or 3 per cent of aluminum palmitate. On subjecting it in a hydraulic press to a temperature of 160–170° C. for 2 to 4 minutes a well-cured molded article is obtained.

In preparing a resin from paraldehyde the proportion of the latter with reference to the phenol may be varied considerably. If an excess of paraldehyde is used above that which will combine with the phenol the acetaldehyde obtained may be withdrawn and suitably collected. If an excess of phenol is used it may remain in the resin to serve as a flux or it may be removed by steam distillation.

Ordinarily the product of the reaction is a fusible reddish brown resin which is soluble in acetone or denatured alcohol. Such a resinous material may be used for hot or cold molding in the plastic field or in the varnish industry. It readily hardens on baking and the effect may be accelerated by the addition of hexamethylenetetramine, acetaldehyde-ammonia and similar hardening agents.

The reaction may be carried out at or below atmospheric pressure, for example as indicated in a vessel equipped with a reflux condenser. The reaction also may be carried out in a closed vessel. Other substances besides hydrochloric or sulphuric acid may be used as catalysts. The acid catalyst employed may be added either to the phenol or the paraldehyde but preferably to the former. The subsequent heating operation at 150° C. is for the purpose of finishing the reaction and bringing about a greater degree of resinification resulting in a harder product. This secondary heating is not necessarily employed in all cases but is desirable. The temperature given for secondary heating is 150° C. but higher or lower temperatures may be used in some cases.

My observations on the literature heretofore published on various synthetic resin products involving the use of phenol and formaldehyde led me to the conclusion that these are couched in such general terms that complete published information is not available to enable the successful production of molding compositions without a large amount of preliminary experimenting. Much secrecy exists in the industry of molding compositions and the public is supplied with as few details as possible. In view of this deficiency of information I have therefore determined to provide a very full description of my process in order that anyone having the proper chemical knowledge can manufacture hereunder in a reasonable time molding compositions of excellent quality.

The problem which has offered me the greatest difficulty and to the solution of which I have made a considerable number of experiments is that of producing flowability conjoined with rapid curing or setting.

Flowability is that softening and penetrating quality of the resinous binder under the influence of heat which is necessary in order to cover the particles of filler and cause a good impress or replica to be made. The surface of the molded article should not show uncoated particles of filler but there should be, if anything, an enrichment in resin at the surface of the molded piece. A slight flow of resin toward the surface aids in producing a smooth, glossy finish with the maximum amount of filler. Hence the resin should become very liquid and penetrating on heating.

*Rate of setting.*—Commercial requirements, today are governed by competition between numerous plastic molding compositions including asphalt and shellac products, "Bakelite," "Redmanol" and "Condensite," hard rubber goods etc. and demand a labor cost in molding not in excess of a certain proportion of the total cost. The output of the molds and presses is fairly well established. A new composition should comply as nearly as possible with existing manipulative conditions or else better them.

A composition which initially is readily flowable on heating but which will cure or set and become rigid in only a few minutes time hardly ever exceeding 6 to 10 minutes total time in the hot press and usually 5 minutes or less, is demanded for pieces of average thickness say ⅛ to ¼ of an inch and if in addition, subsequent cooling in the press may be avoided an improvement results.

In practically all plastic molding compositions it is customary to incorporate a filler in the composition. Fillers may be of a mineral nature, such as clay, talc, whiting, silica, asbestos powder or fibre or mica, or an organic filler may be used such as leather hair, sawdust, especially a fine sawdust or ground wood sometimes called wood flour. Other organic fillers are cotton or silk flock or wood fibre. Some organic fillers such as hair or leather may require a reduction in molding temperature. In general, organic fillers should be molded at temperatures lower than is possible with inorganic ones. Since the filler is usually considerably cheaper than the binder the cost of the composition is lowered in proportion to the amount of filler present. This proportion of filler varies with its density and with the spreading or penetrating powers of the resin. A substance which is not porous such as china clay may be used in much larger proportion than an absorptive material like ground wood or infusorial earth. Bentonite also may be used as a filler. Asbestos pulp was recommended by Smith.

The resin may be mixed with the filler by means of a solvent as previously indicated. After coating or impregnating the filler the solvent may be removed by careful drying, preferably in a vacuum dryer. Too high a temperature of drying or too protracted heating may prevent the resin from flowing well in the mold.

Another very satisfactory way of mixing resin and filler is to carry the conversion of the resin far enough to secure a brittle product and grind this with the filler in a ball mill. Hexamethylenetetramine, acetaldehyde-ammonia, paraform or any other appropriate hardening agent may be added in the ball mill. This ground material may then be passed through mixing rolls such as are ordinarily used for masticating rubber. The treatment on the rolls densifies the material and produces a product which is better suited for molding purposes than is the case when a solvent is employed which may tend to yield a bulky mixture. The more compact or dense the powder the less space is occupied in the mold prior to applying pressure. This reduces the cost of molds somewhat and also decreases the bulk of metal which has to be heated, hence a dense powder is preferred.

The preparation of the resin involves the consideration of many variables. For example in carrying out my process I have found the following variables should not be disregarded.

1. Kind of phenolic body employed.
2. Kind of acid material employed in the initial reaction between phenol and acetaldehyde.
3. Proportion of acetaldehyde.
4. Time of heating the reaction mixture.
5. Temperature of the reaction mixture.
6. Time of drying the resin when a solvent is employed.
7. Temperature of drying of the resin.
8. Effect of filler.
9. Proportion of filler.

These variables all require consideration and adjustment with respect to each other in order to produce a molding composition which meets the requirements of present-day molding operations.

A difficulty which has confronted me and caused me to make a large number of experiments is that which I term over-curing. As previously indicated there must be a balanced condition in that the resin must be very fusible when initially heated but must set rapidly in order to be removed from the mold in a hot condition. These two requirements are inimical. Extreme fusibility results in too slow curing or setting. To obtain successful results in a commercial way the details which I hereinafter set forth should be followed with care.

The difficulty of overcuring manifests itself by a floury surface, leading one to conclude that there is an insufficient amount of resin to coat the particles or fibres of the filler. Yet this surface impairment may occur even when the resin is present in predominating amount. The difficulty apparently is due to contact of some of the particles with the hot mold for too long a time prior to the application of pressure. The heat causes reaction of the resin before the particles have been brought into close contact by pressing resulting in the resin coating becoming glazed and set. The particles of the composition therefore do not fuse and weld together when pressure is applied. This defect may not appear when using small molds but is frequently observed with larger molds which are more difficult to heat evenly. Over-curing may then be expected at the points where the transmission of heat is greatest.

Over-curing may be caused by too long a time of heating together of the reacting raw materials or too high a temperature at this stage, or because too long a time or too high a temperature is used in drying. The presence of an excessive proportion of filler also sometimes gives an appearance somewhat similar to over-curing effects.

The strength of the molded specimen usually increases up to a certain point with increasing additions of filler. Too low a percentage of filler, as is the case with many other resins, hard rubber and the like, fails to yield a product of the desired commercial properties. Too large a proportion of filler also is disadvantageous especially in securing a good flow of the resin and coverage of the filler. The maximum amount of filler of any given type may be determined by making simple strength tests which need not be outlined here.

A very serious difficulty which arises in connection with acetaldehyde phenol resins is the trouble occurring from sticking of the molded article to the mold. This varies with batch to batch of the material and may not cause trouble in one case while in another case exasperating difficulties occur. When a molded piece sticks to the mold it takes time to remove it and both the mold and the article show signs of marks or stains where the adhesion occurs. Greasing the mold such as was employed by Smith in inadequate for hot pressing as employed in the present invention. Stearic acid which has sometimes been employed as a lubricant for the composition is liable to cause pitting of the mold and is not a good preventive of sticking in the case of the present composition. Water-insoluble soaps commonly called metallic soaps overcome this difficulty. Thus one per cent or less of finely divided aluminum palmitate floured over the surface of the molding composition by grinding in the ball mill has a remarkable specific effect in preventing sticking. Larger proportions may be used if necessary for example two or three per cent based on the weight of the total composition. Other metallic soaps such as zinc stearate, magnesium palmitate and the like also may be used, ordinarily only one or two per cent being required. It is important that the metallic soap be in the form of a very fine powder so as not to show on the surface of the molding composition and also to be very intimately distributed throughout the particles. The operation may be likened to dusting the particles of the molding composition with the metallic soap. The soap may be added in other ways as for example when an alcohol solution of the resin is being mixed with filler in any suitable mixing machine such as a Werner-Pfleiderer mixer the metallic soap may be added at this point. In some cases also it may be formed in the composition by precipitation.

Sticking has caused a great deal of difficulty in molding operations and many batches of material otherwise operative have been discarded because of sticking to the mold. The procedure of the present invention makes possible smooth operation in the molding of phenol-acetaldehyde resin without sticking troubles.

In Smith's process a diluent vehicle namely methylated spirit (methyl alcohol in the German patent) or fusel oil was used. This was saturated with the catalyst, hydrochloric acid gas. By employing such a diluent a better control over the reaction was had. Water likewise may be used as a diluent to moderate the reaction. I am of the opinion however that the presence of a diluent such as alcohol or water while serving to moderate the reaction between phenol and paraldehyde brings on a trend of other difficulties. In the present invention I prefer to avoid any diluent such as water, alcohol, acetone etc. as the violence of the reaction may be satisfactorily mitigated by adding the paraldehyde gradually to acidulated phenol. The cooling effect of paraldehyde in depolymerizing affords an excellent control. By working with substantially anhydrous solvents the step of drying may be eliminated. Furthermore by allowing the undiluted raw materials to react a product of especially desirable qualities apparently is obtained. Its property of quick-curing is noticeable. The method of employing anhydrous reagents in this manner allows the reaction to be carried out at atmospheric pressure with simply a reflux condenser so that no expensive equipment is required and dangers of explosion are minimized. The resin is obtained directly in practically a dry state so that it may be ground directly with the filler.

Another point of importance is neutralization of any free mineral acid in the resin. This is of great importance when molding articles for electrical insulation or making products which have metallic inserts. If the free acid is not neutralized trouble may ensue. The addition of a neutralizing agent to the resin and filler in the ball mill will serve in many instances. Thus carbonate or bicarbonate of sodium, carbonate of calcium, calcium oxide or carbonate, zinc oxide may be used. The introduction of ammonia gas and the like may be employed for this purpose. In many cases a practically neutral resin is desired, that is, one neither acid nor alkaline, and in case the resin is to be dissolved in alcohol for impregnation of filler or paper to produce molding composition, laminated pressboard and the like the alcohol solution may be suitably neutralized for example by agitating with carbonate of soda and filtering. Or in other cases the resin may be washed with hot water and finally given a wash with a mild alkaline solution such as dilute sodium carbonate solution.

When the resin is to be used in an alkaline condition the treatment with alkali may be appropriately carried past the neutralization point and the resin given an excess of alkali for this purpose.

Methods of rendering the resin neutral form a part and special subsidiary feature of the present invention.

Besides acetaldehyde and paraldehyde I may use polymers and other substances generating aldehyde and may in some cases employ a dissimilar aldehyde such as butyl aldehyde etc.

In place of phenol I may use cresol such as orthocresol, metacresol or paracresol, or mixtures of these or their commercial forms such as cresylic acid or tar acid. The orthocresol is sluggish in its action with acetaldehyde and is not recommended for quick molding mixtures. The meta and para cresols and especially the commercial mixtures of these may be used in quick molding compositions by themselves but are especially valuable in conjunction with phenol.

Another way of effecting hardening is that of employing an excess of paraldehyde or at least molecular proportions of this substance and phenol with an alkaline catalyst. An example of using acids, is as follows: 100 parts by weight of molten phenol were treated with 50 parts of paraldehyde and 2 c.c. of concentrated hydrochloric acid. Sulphuric acid likewise may be used. The mixture was allowed to react under a reflux and after ebullition had ceased the liquid was heated for 1 hour in an oil bath up to about 150° C. A hard dark red resin resulted.

It should be noted that in adding paraldehyde it is desirable to use a reflux condenser which is well-cooled in order to avoid the loss of acetaldehyde. This of course should be done on the ground of economy of operation. The paraldehyde may be added through the condenser tube.

If to the foregoing resin a small amount of caustic soda is added, for example if the resin is dissolved in a solvent and a small quantity of alcoholic caustic soda added it will be found on evaporating two solutions on a hot plate one containing the caustic soda and the other being untreated, the former, that is the resin which has been rendered slightly alkaline with caustic soda will harden in the course of 15 or 20 minutes to a heat resistant mass while that which has not been treated with alkali does not become infusible even after hours of heating. Of course on continued baking hardening eventually will take place but the rate of hardening is very slow compared with that of the alkaline resin. Products for cold molding may be made of alkaline resin incorporated with asbestos fibre, molded in the mold and subsequently baked.

From the foregoing it might be concluded that the caustic soda serves as a hardening agent. Its action however is simply that of accelerating the reaction between the molecules of the resin made with this proportion of paraldehyde to rapidly convert it into the heat resistant or infusible product. In the present invention I lay claim to the use of caustic soda, caustic potash, calcium oxide, barium oxide and other strong alkaline substances and even those of milder alkaline reaction as catalysts in bringing about the hardening of phenol acetaldehyde resin made with at least equivalent proportions of phenol and acetaldehyde, that is at least one mol. of acetaldehyde to a mol. of phenol.

The procedure in this phase of the invention therefore is to prepare a resin, for example such as is made by Smith using a considerable excess of paraldehyde or to proceed in a somewhat more economical manner and use mol. for mol., or perhaps 10 per cent of aldehyde in excess of molecular equivalent proportions, produce a resin by means of an acid catalyst preferably a mineral acid such as hydrochloric or sulphuric acid, neutralize the resin by means of an alkali such as soda ash and add an excess of the latter or preferably a stronger alkaline substance such as caustic soda. No paraform, hexamethylenetetramine or similar formaldehyde type of hardening agent is thus required. The alkali in conjunction with the excess of paraldehyde creates the hardening condition. One advantage in proceeding in this manner is that the resin tends to be more homogeneous than when paraform, hexamethylenetetramine and various other foreign substances are introduced. Throughout its composition is derived from reaction between the phenolic body and acetaldehyde.

Another desirable feature is that the composition aforesaid may be prepared free from ammonia or from derivatives of formaldehyde such as hexamethylenetetramine which yield ammonia. The absence of such ammonia compounds is conducive to freedom from blistering in molding.

In one case the preparation of Smith's resin was carried out as follows: 2 parts by volume of paraldehyde was mixed with 1 part of methylated spirit (ethyl alcohol containing 10 per cent of methyl alcohol) and to this mixture were added 3 parts of liquefied phenol (liquefied with 5 per cent of water). Methylated spirits were saturated with hydrochloric acid gas at a temperature between 15 and 20° C. 4 volumes of this solution were added to the above mixture. The temperature was kept below about 22° C. by cooling. The liquid at first was yellow but gradually deepened in color slightly on standing at room temperature and at the end of about 36 hours had become a syrupy light brown liquid with just the faintest suggestion of fluorescence.

Prepared as above the solution of Smith's resin was poured into water yielding a whitish precipitate which was washed with dilute carbonate of sodium solution until faintly alkaline. The resin was found to be fusible and readily soluble in denatured alcohol. The alcoholic solution was practically neutral. This resin was found to harden on the hot plate to an infusible mass. The action took place somewhat more quickly on incorporating about 10 per cent of hexa. The infusible resin obtained in this manner was of an orange red color.

When the neutral resin prepared in accordance with the foregoing is incorporated with 10 per cent of hexa and molded in a hot press at a temperature of 160° C. and 1000 pounds pressure per square inch setting or curing occurs very rapidly. In 1 minute a very substantial degree of hardening takes place and in 3 minutes a test specimen could be removed hot from the mold. Further pressing for an additional period of 2 or 3 minutes improves the cure. The reaction in the mold is so rapid that overcuring with consequent lack of flowability may occur and a lesser amount of hexa than 10 per cent therefore is recommended. The proportion of hexa may be adusted to meet the molder's requirements.

Still another phase of the invention is that of adding an entirely dissimilar resinous substance or plastic material obtained by reaction betwen urea and formaldehyde preferably in the presence of an acid catalyst. One product namely dimethylol urea may be incorporated with Smith's resin with or without the addition of hexa to produce plastic material adapted for certain uses. The proportion of the urea resin may be from say 10 to 20 per cent of Smith's resin and upwards. In some cases a major proportion of the urea resin is employed. The latter resin may be obtained in a neutral or slightly alkaline condition which is favorable for incorporation with a resin made from phenol and paraldehyde. Suitable fillers may be added to such resin mixtures. Also agents having a plasticizing effect such as aniline, toluidine and the like may be employed in any of the foregoing compositions.

What I claim is:—

1. The process of making a resin hardening under the action of heat which comprises reacting on a phenolic body with at least a full molecular proportion of paraldehyde in the presence of an acid catalyst, whereby a resin is formed, neutralizing the resin and adding an excess of an alkali whereby a product readily hardening on exposure to heat is obtained.

2. A heat hardened fusible phenol-acetaldehyde resin of alkaline reaction devoid of paraform, hexamethylenetetramine and similar formaldehyde compounds and formaldehyde derivatives.

CARLETON ELLIS.